United States Patent
Coletta et al.

(10) Patent No.: US 7,685,082 B1
(45) Date of Patent: Mar. 23, 2010

(54) SYSTEM AND METHOD FOR IDENTIFYING, PRIORITIZING AND ENCAPSULATING ERRORS IN ACCOUNTING DATA

(75) Inventors: Paul Coletta, Carlsbad, CA (US); Floyd J. Morgan, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 693 days.

(21) Appl. No.: 11/413,308

(22) Filed: Apr. 28, 2006

(51) Int. Cl.
*G06N 5/00* (2006.01)
*G06N 7/00* (2006.01)

(52) U.S. Cl. .............................. 706/45; 706/46; 706/47

(58) Field of Classification Search .................... None
See application file for complete search history.

(56) References Cited

U.S. PATENT DOCUMENTS

| | | | |
|---|---|---|---|
| 6,311,166 B1 * | 10/2001 | Nado et al. ................... 705/30 |
| 7,254,554 B2 * | 8/2007 | Tawara et al. ................. 705/30 |
| 2003/0050876 A1 * | 3/2003 | Tawara et al. ................. 705/30 |
| 2005/0278221 A1 * | 12/2005 | Hahn-Carlson et al. ....... 705/16 |
| 2005/0289023 A1 * | 12/2005 | Hahn-Carlson et al. ....... 705/30 |
| 2005/0289024 A1 * | 12/2005 | Hahn-Carlson et al. ....... 705/30 |

OTHER PUBLICATIONS

"QuickBooks® Assessing the Health of the Data File and Troubleshooting", The Sleeter Group, Aug. 2005 (71 pages).

* cited by examiner

*Primary Examiner*—David R Vincent
*Assistant Examiner*—Adrian L Kennedy
(74) *Attorney, Agent, or Firm*—Osha • Liang LLP

(57) ABSTRACT

A method for detecting errors includes obtaining input data, applying a knowledge base to the input data, identifying diagnostics associated with errors in the input data, encapsulating data snippets corresponding to errors with associated diagnostic codes to obtain encapsulated data snippets, and outputting encapsulated data snippets.

27 Claims, 6 Drawing Sheets

SYSTEM AND METHOD FOR IDENTIFYING, PRIORITIZING AND ENCAPSULATING ERRORS IN ACCOUNTING DATA

BACKGROUND

Artificial intelligence, or AI, is a branch of computer science dealing with intelligent behavior, learning and adaptation in machines. AI research is focused on producing machines that automate tasks requiring intelligent behavior. Real-world applications of AI include handwriting, speech, and facial recognition, computer and video games, and the ability to answer diagnostic and consumer questions.

Expert systems are a class of computer software that makes up a subset of artificial intelligence. Unlike more typical artificial intelligence models, which tend to be procedural, algorithmic, numerical, or mathematical, expert systems use empirical knowledge to solve problems in specific problem domains. In general, expert systems are employed to solve problems that require the knowledge and experience of human experts. Because knowledge is a fundamental element of expert systems, they are also referred to as knowledge-based systems.

Typically, an expert system is composed of two primary components: the knowledge base and the inference engine. The knowledge base is essentially the collection of domain-specific knowledge that is applied to the problem at hand. Knowledge bases are usually represented as ideas, facts, concepts, and statistical probabilities and their associative relationships. Knowledge bases are derived from human expert knowledge and encoded in a logical form that the expert system can understand. A knowledge base provides the backbone of the expert system and allows the system to accurately evaluate potential problems.

The inference engine forms the brain of the expert system. It emulates the human capability to arrive at conclusions by reasoning about the information in the knowledge base. Inference engines typically employ one of two types of inferencing: forward chaining and backward chaining. Forward chaining, or data driven inferencing, starts with available data and applies rules to the data to extract more information until a goal is reached. Backward chaining, or goal driven inferencing, begins with a list of goals and works backwards through the rules to see whether available data supports the goals.

Expert systems are used in many domains, including accounting, medical, oil exploration, video games, and consumer-product matching. While individual expert systems are applied to highly specific domains, each system can easily be adapted to another domain by changing the knowledge base. The inference engine can be applied to virtually any body of knowledge, provided the knowledge is encoded in a form understandable by the expert system.

SUMMARY

In general, in one aspect, the invention relates to a method for detecting errors, comprising obtaining input data, applying a knowledge base to the input data, identifying diagnostics associated with errors in the input data, encapsulating data snippets corresponding to errors with associated diagnostic codes to obtain encapsulated data snippets, and outputting encapsulated data snippets.

In general, in one aspect, the invention relates to a computer usable medium having computer readable program code embodied therein for causing a computer system to execute a method for error detection comprising obtaining input data, applying a knowledge base to the input data, identifying diagnostics associated with errors in the input data, encapsulating data snippets corresponding to errors with associated diagnostic codes to obtain encapsulated data snippets, and outputting encapsulated data snippets.

In general, in one aspect, the invention relates to a system for error detection comprising a rule generator configured to process expert information and an expert system configured to encapsulate data snippets corresponding to errors with associated diagnostic codes to obtain encapsulated data snippets, wherein errors are encapsulated with associated diagnostic codes.

Other aspects of the invention will be apparent from the following description and the appended claims.

DETAILED DESCRIPTION

Figure 1:
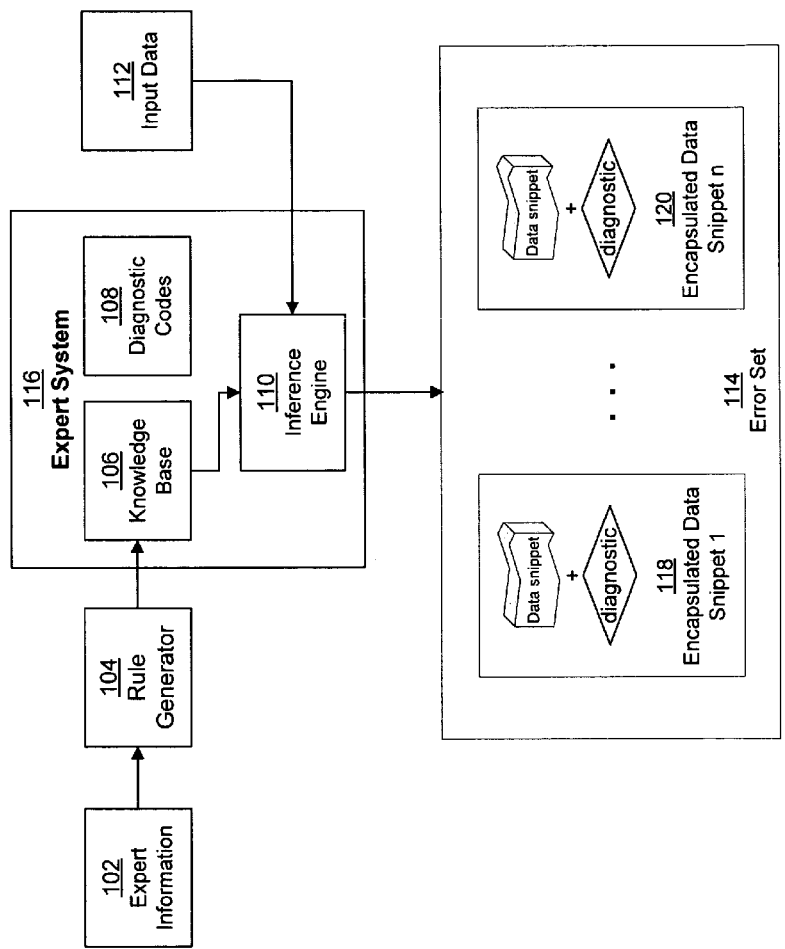
FIGS. 1-3 show schematic diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to detect and output errors using an expert system. As an example, one or more embodiments of the invention provide a method and apparatus to detect and output accounting errors using an expert system.

Specifically, embodiments of the invention allow for error detection in specific domains based on input data and a knowledge base. The knowledge base is applied to the input data using the inference engine, and data snippets corresponding to errors are paired with diagnostics and encapsulated in diagnostic codes. Output includes the encapsulated data snippets.

FIG. 1 shows a system for error detection in accordance with one or more embodiments of the invention. As shown in FIG. 1, the system includes expert information (102), a rule generator (104), an expert system (116), input data (112), and an error set (114). Each of these components is described below.

Expert information (102) corresponds to a body of information related to a specific domain that allows problems in the domain to be solved. Typically, expert information resembles knowledge acquired by a human expert in the domain. While one or more embodiments of the invention may derive expert information directly from a human expert, those skilled in the art will appreciate that expert information may be obtained from various other sources. For example, expert information may be derived from a database, a textbook, a scientific journal, a white paper, a technical manual, or other similar sources.

The rule generator (104) processes expert information (102) and converts it into a knowledge base (106). Because expert information (102) may not be represented in a form that is readable by the expert system (116), the rule generator (104) converts the expert information (102) into a more logical form in the knowledge base (106). In one or more embodiments of the invention, the rule generator parses the expert information (102) and maps it to data structures suitable for storing and representing expert information (102) such that the expert system (116) can use the data structures to analyze input data (112) and detect errors within input data (112). For example, the statement "If the sky is cloudy and the temperature is cold, then it will snow" may be converted to the logic statement "(sky==cloudy) && (temperature==cold)=> (weather==snow)." The expert system (116) can then apply the logic statements to the input data (112) to create an error set (114).

The expert system (116) includes a knowledge base (106), diagnostic codes (108), and an inference engine (110). The expert system (116) is responsible for analyzing the input data (112) to detect errors. Diagnostic codes (108) are used to classify the errors, and the expert system (116) encapsulates the input data (112) with the associated diagnostic codes (108) to form the error set (114). Each component of the expert system (116) is described in further detail below.

The knowledge base (106) includes knowledge representation that can be understood by the expert system (116). While one or more embodiments of the invention represent the knowledge base (106) using formal logic and prepositional calculus, those skilled in the art can appreciate that various other paradigms exist for knowledge representation and can be utilized in the knowledge base (106). For example, a knowledge base (106) is often represented using a series of "if . . . then" statements, or as a set of facts linked with associative relationships. Those skilled in the art will also appreciate that the knowledge base (106) is scalable and can be expanded at any time with the addition of new expert information (102) without bringing the system down (i.e., offline). Furthermore, more than one knowledge base (106) may exist for an expert system (116). One skilled in the art will appreciate that this functionality would allow the expert system (116) to analyze input data (112) from multiple domains.

Diagnostic codes (108) are used by the expert system (116) to classify and encapsulate errors in the input data (112). Once the expert system (116) has obtained an error, a determination is made regarding the type of error that exists and the data snippet corresponding to the error is encapsulated with the diagnostic code (108). Those skilled in the art will appreciate that diagnostic codes may be obtained from various sources and represented in various forms. For example, the diagnostic codes (108) may map directly to parts of the knowledge base (106), consist of primary keys that lead to values in a relational database, or be input in a text file.

The inference engine (110) processes the input data (112) using the knowledge base (106). In one or more embodiments of the invention, the inference engine (1110) may apply the knowledge base (106) to data snippets to determine whether the data snippets contain errors, known as forward chaining, or the inference engine (110) may form a hypothesis as to whether each type of error exists in the data snippets and test the validity of the hypothesis using the knowledge base (106), known as backward chaining. Those skilled in the art will appreciate that one or more embodiments of the invention may use other inferencing methods in the inference engine (110). Once an error is found (forward chaining) or verified (backward chaining), the error is then classified using the appropriate diagnostic code (108).

Input data (112) is passed to the expert system (116) and processed for errors. Those skilled in the art will appreciate that various methods and storage formats exist for input data (112). For example, input data (112) may include files on a computer system, user input through a user interface, or any combination of the two. Furthermore, while the input data (112) is specific to the domain of the knowledge base (106), the expert system (116) is not limited to detecting errors of only that domain. A knowledge base (106) from a different domain may be incorporated, thus allowing the expert system (116) to process input data (112) from that domain as well.

The error set (114) is linked to the inference engine (110) and corresponds to the output of the expert system (116). The expert system (116) analyzes the input data (112) for errors based on rules supplied in the knowledge base (106). When an error is found in the input data (112), the expert system (116) determines what type of error exists and identifies the corresponding diagnostic code (108). The expert system (116) then isolates the data snippet corresponding to the error and encapsulates the data snippet with the associated diagnostic code (108). This forms an encapsulated data snippet 1 (118), which forms the first element of the error set (114). Subsequent errors are dealt with similarly until the error set includes encapsulated data snippet 1 (118) to encapsulated data snippet n (120).

Those skilled in the art will appreciate that based on the input data (112), any number of errors may be found. Thus, in one or more embodiments of the invention, the error set may include no encapsulated data snippets at all, one encapsulated data snippet (encapsulated data snippet 1 (118)), or multiple encapsulated data snippets (encapsulated data snippet 1 (118), encapsulated data snippet n (120)). Furthermore, those skilled in the art will appreciate that a data snippet may correspond to one or more errors, which in turn may correspond to one or more diagnostic codes. In such a case, in one or more embodiments of the invention, one or more encapsulated data snippets may contain the same data snippet encapsulated with different errors.

In one or more embodiments of the invention, the data snippet may be bound to the diagnostic by an XML tag specifying the diagnostic code (108) associated with the error in the data snippet. For example, if a number in the input data (112) representing an employee's salary is negative and generates a "negative salary" error, the encapsulated data snippet (encapsulated data snippet 1 (118), encapsulated data snippet n (120)) may be represented with the XML code:

<negative salary>
<element>Doe, John Salary February 2006</element>
<value>-3246.98</value>
</negative salary>

In one or more embodiments of the invention, the error set (114) may be represented as a table with one column containing the diagnostics and the other column containing data snippets corresponding to the diagnostics. An example table may be represented with the following:

| Diagnostic | Data Snippet |
|---|---|
| negative salary | Doe, John Salary February 2006: -3246.98 |
| decimal place | Doe, John Salary March 2006: 324698.00 |

One skilled in the art will appreciate that while two examples of encapsulated data snippet (encapsulated data snippet 1

(118), encapsulated data snippet n (120)) representation have been provided, other encapsulated data snippet representations can be devised which do not depart from the scope of the invention.

Figure 2:
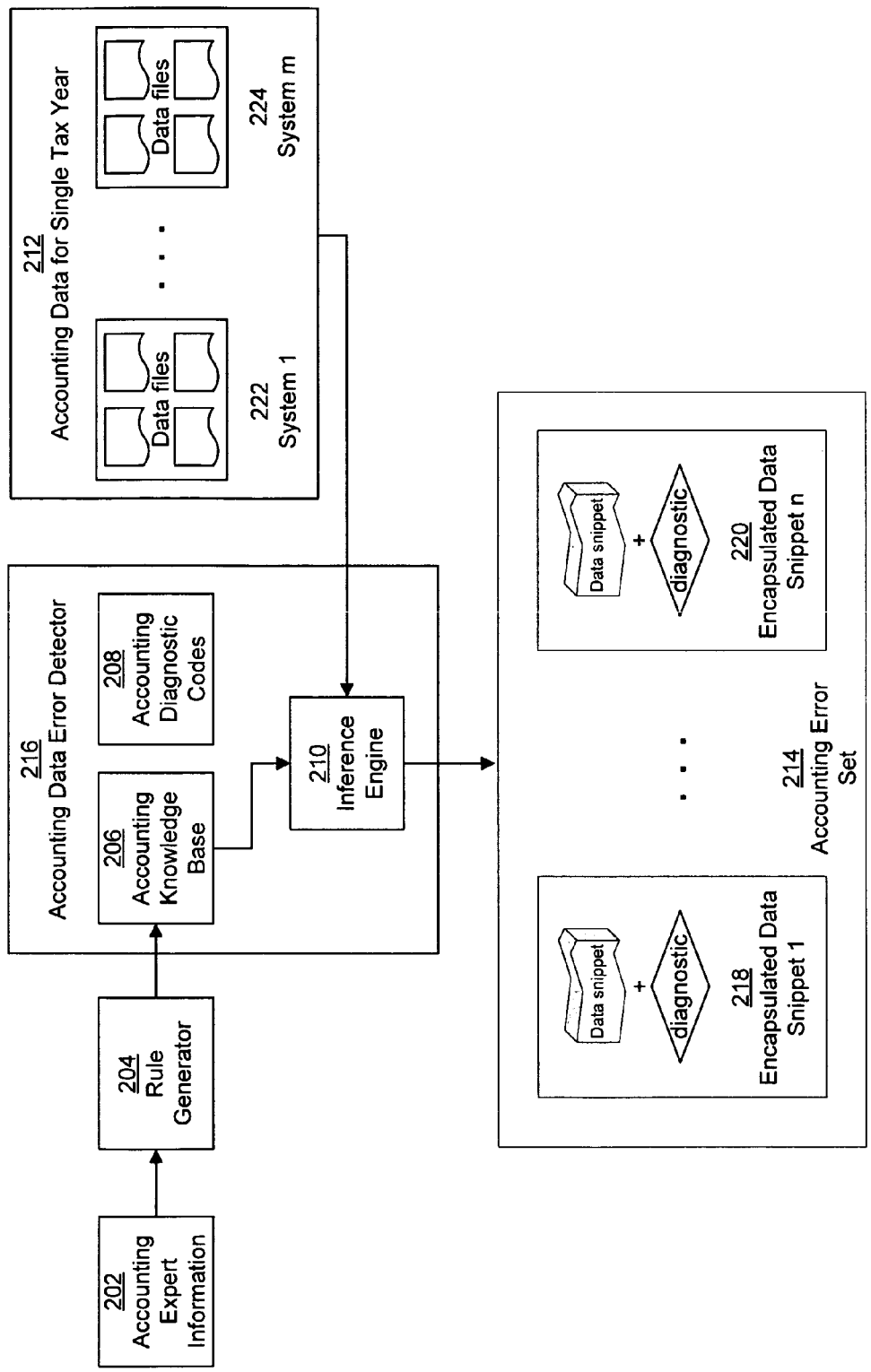

FIG. 2 shows a system for accounting data error detection in accordance with one or more embodiments of the invention. Specifically, FIG. 2 depicts one or more embodiments of the invention used to detect errors in accounting data from a single tax year (212). The accounting data from single tax year (212) is stored on multiple files within multiple systems (system 1 (222), system m (224)) which have no correlation with the multiple encapsulated data snippets (encapsulated data snippet 1 (218), encapsulated data snippet n (220)). Thus, the input data (112) of FIG. 1 corresponds to the set of accounting files belonging to a single tax year (212), possibly distributed on multiple systems, in FIG. 2. The rule generator (204) and inference engine (210) are as described in FIG. 1. The accounting data error detector (216) corresponds to the expert system (116) of FIG. 1 applied to the domain of accounting error detection. The accounting error set (214) is the output of the accounting data error detector (216) and corresponds to the error set (114) of FIG. 1.

Continuing with FIG. 2, accounting expert information (202) corresponds to a specific body of expert information in the field of accounting. For example, accounting expert information (202) may include mathematical formulas for calculating tax withholding, allowed storage formats for values in accounts payable and accounts receivable, etc. As described above, accounting expert information (202) may come from various sources and may resemble knowledge that a human accounting expert may have.

In one or more embodiments of the invention, the accounting knowledge base (206) is produced from the accounting expert information (202) via the rule generator (204). The accounting knowledge base (206) and the accounting diagnostic codes (208) differentiate the accounting data error detector (216) from a generic expert system. However, one skilled in the art will appreciate that including a knowledge base and diagnostic codes from another domain allows the accounting data error detector (216) to detect errors in that domain as well without changing the inference engine (210).

The accounting error set (214) is the output of the accounting error data detector (216) and includes data snippets from accounting data for one tax year (212) encapsulated in accounting diagnostic codes (208) that correspond to the errors found in the data snippets. The accounting error set (214) corresponds to the error set (114) of FIG. 1. One skilled in the art will appreciate that examples of encapsulated data snippets (encapsulated data snippet 1 (218), encapsulated data snippet n (220)) from the accounting error set (214) would be similar to those provided above in the description of FIG. 1.

In one or more embodiments of the invention, the accounting data error detector (216) is also configured to detect spelling errors within the data. In such embodiments, the accounting knowledge base (202) includes a dictionary as well as a set of common spelling errors. Further, the accounting knowledge base (202) may contain inference rules for classifying spelling errors based on context. For example, if a bank name has been misspelled, the accounting data error detector (216) identifies the misspelling and flags the error, encapsulating the error with an associated diagnostic code (208). To help identify the misspelling, the accounting data error detector (216) may search within the accounting files from a single tax year (212) to see whether the bank name is spelled correctly elsewhere in the data. As stated above, diagnostic codes (208) may be represented in a variety of ways. For example, a misspelling of a bank name may be encapsulated with a simple "spelling error" diagnostic, a "bank not found" diagnostic, or a diagnostic that identifies the correct spelling of the bank name. Further, in one or more embodiments of the invention, the spelling error is corrected and then presented to a user to verify the corrected form of the alleged erroneous data.

Figure 3:
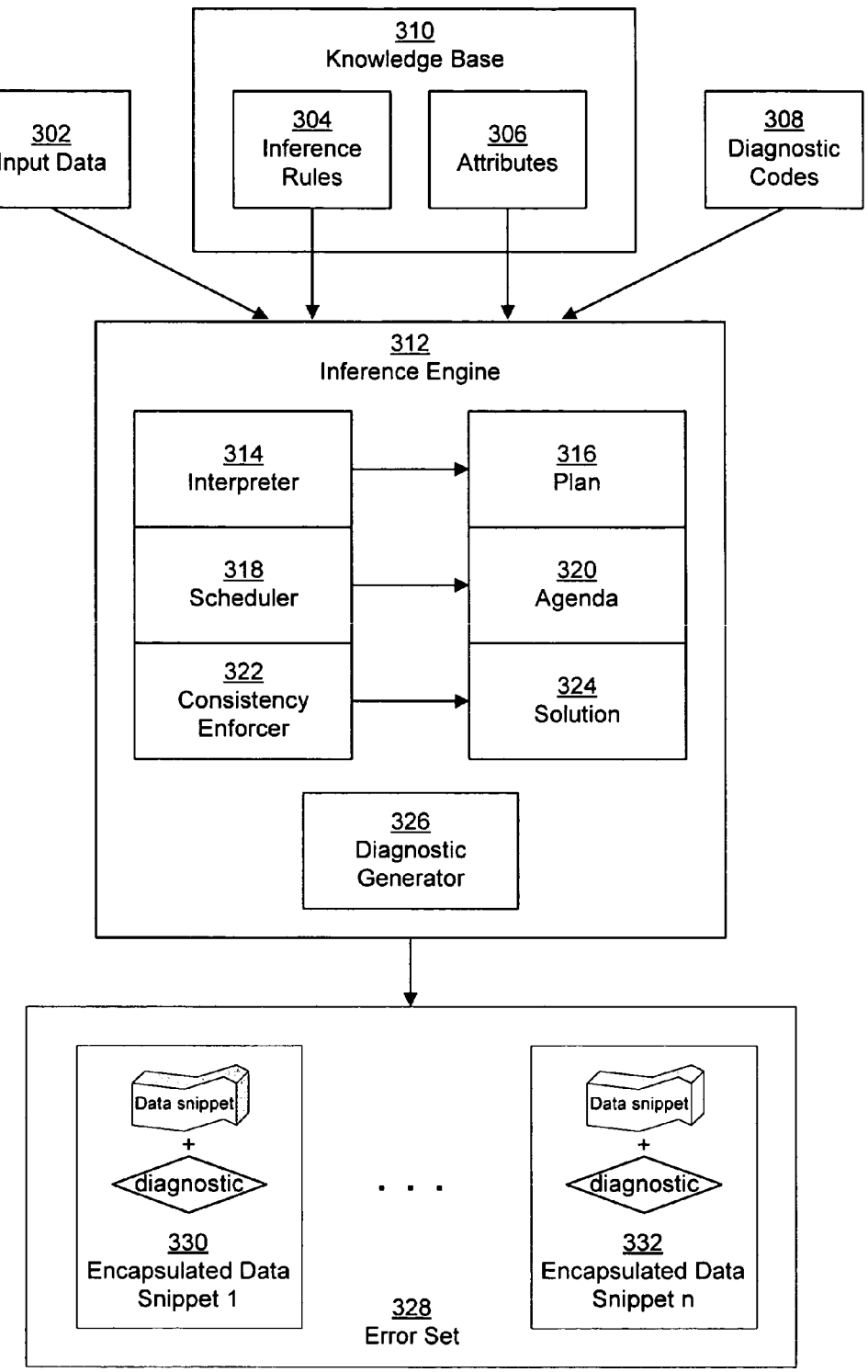

FIG. 3 shows an expert system for error detection in accordance with one or more embodiments of the invention. In particular, FIG. 3 depicts the knowledge base (310) and inference engine (312) in greater detail. Other parts of the figure, including input data (302), diagnostic codes (308), and the error set (328) are as described above in FIG. 1. The knowledge base (310), shown in FIG. 3, includes inference rules (304) and attributes (306). The inference engine can be abstracted into an interpreter (314), scheduler (318), and consistency enforcer (322) which help produce or implement a plan (316), agenda (320), and solution (324). The diagnostic generator (326) is responsible for generating the error set (328) after the inference engine (312) has analyzed the input data (302). Each component of the knowledge base (310) and inference engine (312) is described below.

The knowledge base (310) can be broken down into inference rules (304) and attributes (306). In essence, attributes (306) can be seen as "facts" and inference rules (304) the relations between attributes (306). In one or more embodiments of the invention, attributes (306) may be variables that take on values that may be numeric, text, Boolean, or other types of variables. The knowledge base (310) stores the factual knowledge in the attributes (306). For example, an attribute (306) may be represented as "a child is a dependent" or "a Visa is a credit card."

Inference rules (304) establish relations between attributes (306). In one or more embodiments of the invention, inference rules (304) are represented as logic statements of the form:

premise 1

. . .

premise n conclusion

The premises and conclusion are made up of attributes (306), and the expression is defined such that if all premises have been met in the course of logical derivation, then the conclusion can also be accepted as true. For example, the statement "Alligator eggs produce female hatchlings when the temperature is in the low 80's Fahrenheit" can be represented using the form above as:

eggs=alligator's temperature <83 F temperature >80 F hatchling=female alligator

Continuing with FIG. 3, within the inference engine (312), the plan (316) holds the overall goals of the expert system. At a high level, the plan may be described as accurately identifying errors in the input data (302) using the knowledge base (310), classifying the errors by encapsulating the errors with the associated diagnostic codes (308), and outputting the errors as encapsulated data snippets (330, 332) in the error set (328).

The agenda (320) is a list of actions awaiting execution by the system. A simple example of an agenda (320) is going through every data snippet in the input data (302) in some order, applying the knowledge base (310) to the input data to determine whether any errors exist. Those skilled in the art will appreciate that different agendas involving actions executed in different orders may produce the same error set (328). The solution (324) holds the result obtained by the inference engine (312) and any dependencies the result may have. For example, the result "total cost of operation=correct" may have the dependency that all costs in the operation are reported and added together correctly.

Continuing with FIG. 3, the interpreter (314) meets the goals in the plan (316) by executing the chosen action. For example, an action may involve checking that an employee's pay is within a normal range. The scheduler (318) arranges the agenda by determining which action to execute next. This may be done in a consecutive fashion, with the inference engine (312) cycling from one data snippet to the next, or the scheduler may rearrange the agenda based on a result. For example, if an account balance is found to be in error, instead of proceeding to the next data snippet in memory, the scheduler may decide to go back and determine elements causing the account balance error, then go back further and determine whether further errors exist that precede those elements.

The consistency enforcer (322) maintains consistency in the emerging solution, including keeping track of dependencies between conclusions. For example, if an account balance is found to be correct by passing it through one set of inference rules (304), but a later action determines that a credit to the account should have been a debit, then the conclusion "account balance=correct" needs to be changed to "account balance=error." After a conclusion has been determined, the diagnostic generator (326) then needs to classify errors with diagnostic codes (308) and form encapsulated data snippets (330). For example, the account balance error above may be encapsulated with the diagnostic code "debit/credit error."

Figure 4:
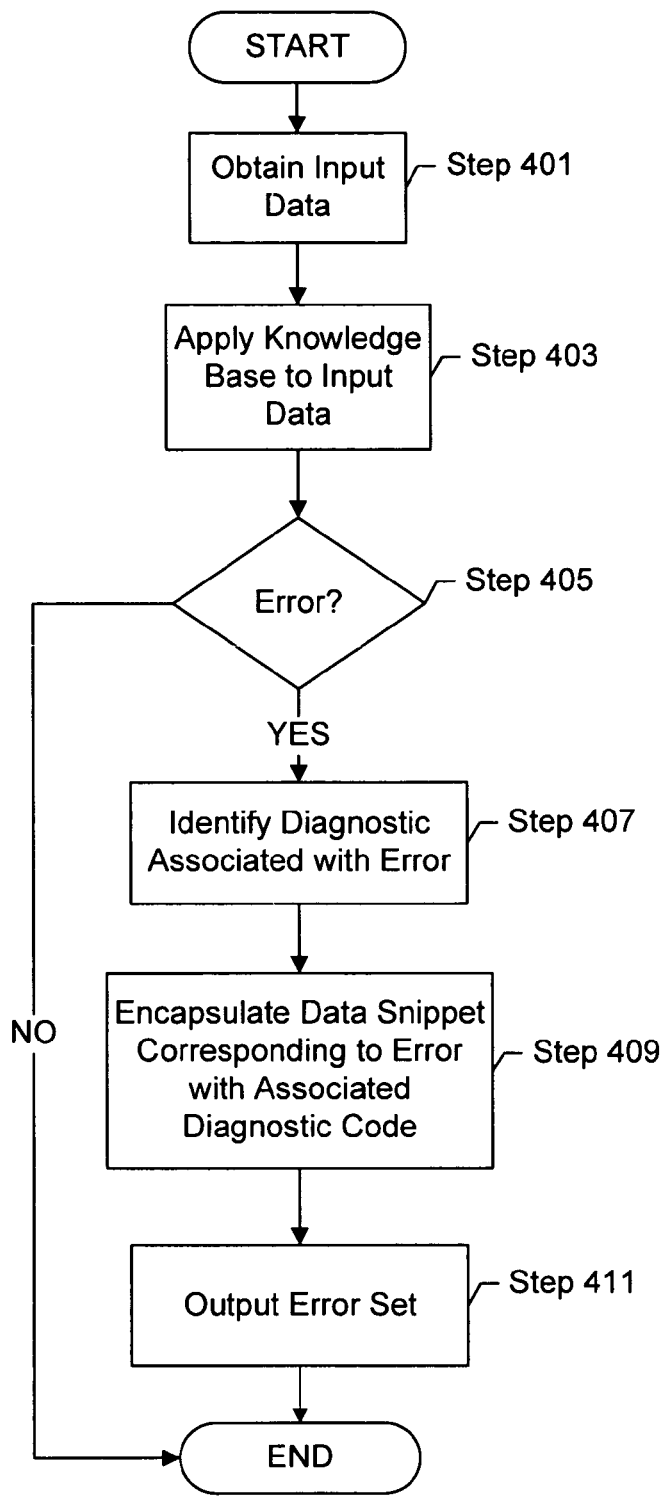
FIGS. 4-5 show flow diagrams in accordance with one or more embodiments of the invention.

FIG. 4 shows a flow diagram of a method for error detection in accordance with one or more embodiments of the invention. Specifically, FIG. 4 shows the steps used by the expert system in determining and classifying error in input data. First, input data is obtained (Step 401). Once obtained, the knowledge base is applied to the input data (Step 403). Each data snippet is checked for errors (Step 405) using the knowledge base. If no error is found, then the system is done with that chunk of data and nothing else needs to be finished.

If an error is found, the system classifies the error by identifying the diagnostic associated with the error (Step 407). Once that is complete, an encapsulated data snippet is created by encapsulating the data snippet corresponding to the error with the associated diagnostic code (Step 409). The error set, including encapsulated data snippets formed from errors in the input data and diagnostic codes, is then outputted (Step 411).

Figure 5:
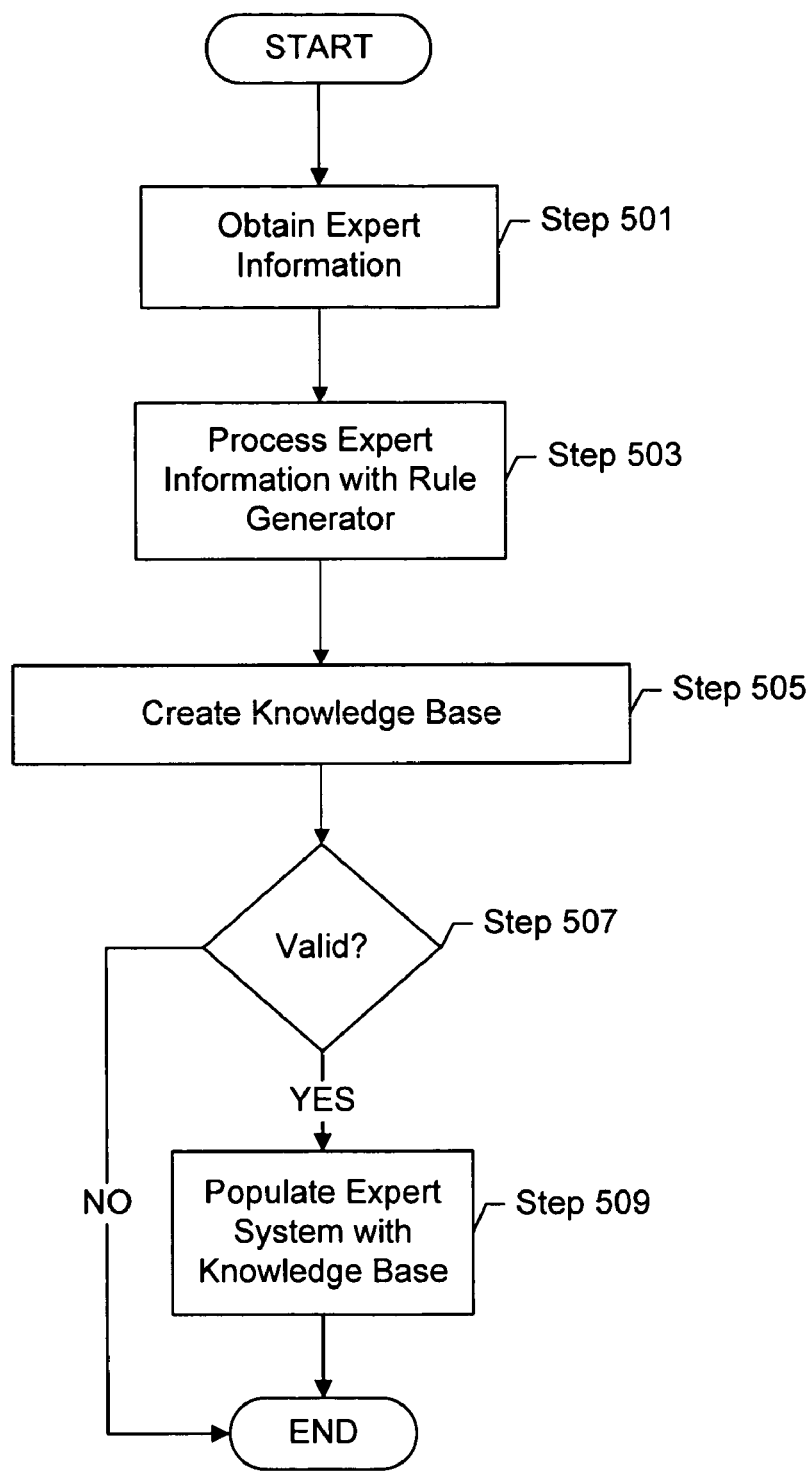

FIG. 5 shows a flow diagram of a method for creating a knowledge base in accordance with one or more embodiments of the invention. Specifically, FIG. 5 describes how expert information is converted to a form that is usable by the expert system. Initially, expert information is obtained (Step 501). As stated above, expert information may be acquired from various sources, including human experts, textbooks, technical documents, manuals, etc. Once the expert information is obtained, the information is translated and linked such that the expert system can understand the attributes and use inference rules to arrive at conclusions. In one or more embodiments of the invention, the knowledge base may be contained in a relational database, a set of data structures, or a set of XML files with tags specifying attributes and inference rules.

The expert information is then processed with the rule generator (Step 503) to create the knowledge base (Step 505). For example, the expert information may include sentences in English, which need to be parsed and separated into attributes that are linked together using inference rules. The rule generator may be a computer program that parses statements inputted by human experts, a computer program that assembles a knowledge base by scanning database files, a human knowledge engineer that translates statements made by human experts into data structures, etc.

Once the knowledge base is created, it is checked for validity (Step 507). To check validity, the knowledge base may be reviewed by human experts or knowledge engineers or verified against the database from which the knowledge base was obtained. The knowledge base may also be tested using sample input data to ensure that accurate conclusions are produced. If the knowledge base is valid, then the expert system is populated with the knowledge base (Step 509) and the knowledge base can be applied to real input data. Otherwise, the knowledge base is not used in the expert system, and the knowledge base is either revised or replaced.

Figure 6:
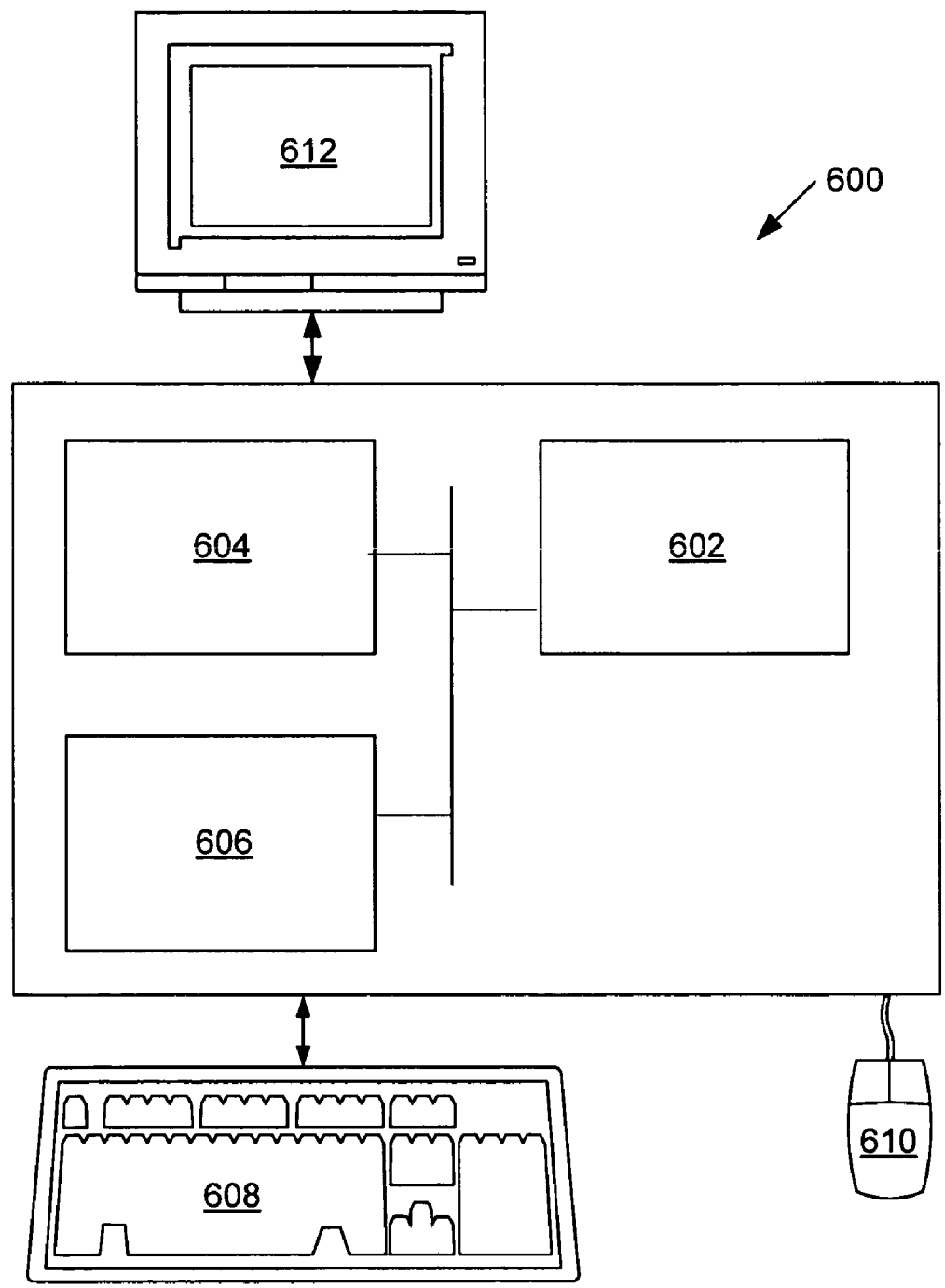
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., knowledge base, inference engine, input data, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting errors, comprising:
   obtaining accounting data;
   identifying an error in the accounting data by applying a knowledge base to the accounting data using a plurality of actions performed by a processor of a computer system;
   prioritizing, using the processor, the plurality of actions based on an error set comprising snippets of erroneous accounting data tagged with accounting diagnostics;
   classifying the error using a diagnostic code;
   encapsulating a data snippet with the diagnostic code, using the processor, to create an encapsulated data snippet, wherein the data snippet comprises a portion of the accounting data corresponding to the error;

adding the encapsulated data snippet to the snippets of erroneous accounting data in the error set; and displaying the error set.

2. The method of claim 1, further comprising:

obtaining expert information;

processing the expert information using a rule generator to generate a plurality of inference rules and a plurality of attributes;

forming the knowledge base comprising the plurality of inference rules and the plurality of attributes; and populating an expert system with the knowledge base.

3. The method of claim 2, wherein the expert system further comprises:

an inference engine for applying the knowledge base to the accounting data.

4. The method of claim 3, wherein the inference engine comprises:

a plan comprising a plurality of goals of the expert system;

an interpreter configured to execute the plurality of actions by applying the plurality of inference rules and the plurality of attributes to the accounting data to achieve the plurality of goals set forth in the plan;

an agenda configured to hold the plurality of actions prior to execution, wherein each of the plurality of actions is an instance of applying the plurality of inference rules and the plurality of attributes to the accounting data;

a scheduler configured to control the agenda by prioritizing the plurality of actions;

a solution comprising the error set emerging from performing the plurality of actions after prioritizing the plurality of actions;

a consistency enforcer configured to maintain consistency in the emerging solution; and a diagnostic generator configured to encapsulate data snippets from accounting data with the associated diagnostic codes.

5. The method of claim 1, wherein the accounting data comprises accounting data for a tax year.

6. The method of claim 1, wherein the knowledge base comprises accounting rules and accounting attributes.

7. The method of claim 1, wherein the error set comprises snippets of misspelled words tagged with a plurality of spelling errors.

8. The method of claim 1, further comprising:

analyzing the accounting data for a spelling error.

9. The method of claim 8, further comprising:

correcting the accounting data to remove the spelling error.

10. A computer readable storage medium having computer readable program code embodied therein for causing a computer system to execute a method for error detection comprising:

obtaining accounting data;

identifying an error in the accounting data by applying a knowledge base to the accounting data using a plurality of actions performed by a processor of the computer system;

prioritizing the plurality of actions based on an error set comprising snippets of erroneous accounting data tagged with accounting diagnostics;

classifying the error using a diagnostic code;

encapsulating a data snippet with the diagnostic code to create an encapsulated data snippet, wherein the data snippet comprises a portion of the accounting data corresponding to the error;

adding the encapsulated data snippet to the snippets of erroneous accounting data in the error set; and storing the error set in a repository.

11. The computer readable storage medium of claim 10, wherein the method further comprises:

obtaining expert information;

processing the expert information using a rule generator to generate a plurality of inference rules and a plurality of attributes;

forming the knowledge base comprising the plurality of inference rules and the plurality of attributes; and populating an expert system with the knowledge base.

12. The computer readable storage medium of claim 11, wherein the expert system further comprises:

an inference engine for applying the knowledge base to the accounting data.

13. The computer readable storage medium of claim 12, wherein the inference engine comprises:

a plan comprising a plurality of goals of the expert system;

an interpreter configured to execute the plurality of actions by applying the plurality of inference rules and the plurality of attributes to the accounting data to achieve the plurality of goals set forth in the plan;

an agenda configured to hold the plurality of actions prior to execution, wherein each of the plurality of actions is an instance of applying the plurality of inference rules and the plurality of attributes to the accounting data;

a scheduler configured to control the agenda by prioritizing the plurality of actions;

a solution comprising the error set emerging from performing the plurality of actions after prioritizing the plurality of actions;

a consistency enforcer configured to maintain consistency in the emerging solution; and a diagnostic generator configured to encapsulate data snippets from the accounting data with the associated diagnostic codes.

14. The computer readable storage medium of claim 10, wherein the accounting data comprises accounting data for a tax year.

15. The computer readable storage medium of claim 10, wherein the knowledge base comprises accounting rules and accounting attributes.

16. The computer readable medium of claim 10, wherein the error set comprises snippets of misspelled words tagged with a plurality of spelling errors.

17. The computer readable storage medium of claim 10, wherein the knowledge base comprises a dictionary associated with a plurality of spelling errors.

18. The computer readable storage medium of claim 17, wherein the plurality of spelling errors comprises snippets of misspelled words tagged with spelling diagnostics.

19. A system for error detection comprising:

a processor;

a rule generator configured to process expert information to generate a plurality of inference rules and a plurality of attributes;

an expert system configured to:

obtain accounting data;

identify an error in the accounting data by applying the plurality of inference rules and the plurality of attributes to the accounting data using a plurality of actions performed by the processor;

classify the error using a diagnostic code;

encapsulate a data snippet with the diagnostic code, using the processor, to create an encapsulated data snippet, wherein the data snippet is a portion of the accounting data corresponding to the error;

add the encapsulated data snippet to an error set; and store the error set in a repository; and a scheduler configured to prioritize the plurality of actions based on the error set.

20. The system of claim 19, further comprising:

a plan comprising a plurality of goals of the expert system;

an interpreter configured to execute the plurality of actions by applying the plurality of inference rules and the plurality of attributes to the accounting data to achieve the plurality of goals set forth in the plan;

an agenda configured to hold the plurality of actions prior to execution, wherein each of the plurality of actions is an instance of applying the plurality of inference rules and the plurality of attributes to the accounting data, wherein the scheduler prioritizes the plurality of actions by controlling the agenda;

a solution comprising the error set emerging from performing the plurality of actions after prioritizing the plurality of actions;

a consistency enforcer configured to maintain consistency in the emerging solution; and a diagnostic generator configured to encapsulate data snippets from the accounting data with the associated diagnostic codes.

21. The system of claim 19, wherein the accounting data comprises accounting data for a tax year.

22. The system of claim 21, wherein error detection is applied to the accounting data.

23. The system of claim 19, wherein the knowledge base further comprises a dictionary associated with a plurality of spelling errors.

24. The system of claim 23, wherein the plurality of spelling errors comprises snippets of misspelled words tagged with spelling diagnostics.

25. The method of claim 1, further comprising:
correcting the error.

26. The computer readable storage medium of claim 10, the method for error detection further comprising:
correcting the error.

27. The system of 19, the expert system further configured to correct the error.

* * * * *